United States Patent [19]

Furukawa et al.

[11] Patent Number: 5,654,366
[45] Date of Patent: Aug. 5, 1997

[54] THERMOPLASTIC RESIN COMPOSITION

[75] Inventors: Haruhiko Furukawa; Yoshitsugu Morita; Akihiro Nakamura; Hiroshi Ueki, all of Chiba Prefecture, Japan

[73] Assignee: Dow Corning Toray Silicone Co., Ltd., Tokyo, Japan

[21] Appl. No.: 604,138

[22] Filed: Feb. 20, 1996

[30] Foreign Application Priority Data

Feb. 27, 1995 [JP] Japan ................................. 7-063370
Feb. 27, 1995 [JP] Japan ................................. 7-063371

[51] Int. Cl.$^6$ ........................... C08L 25/12; C08L 55/02
[52] U.S. Cl. ........................................ 525/101; 525/105
[58] Field of Search .................................. 525/100, 101, 525/105, 106

[56] References Cited

U.S. PATENT DOCUMENTS

| | | | |
|---|---|---|---|
| 3,686,356 | 8/1972 | Saam | 525/92 G |
| 3,715,411 | 2/1973 | Day et al. | 525/105 |
| 3,898,300 | 8/1975 | Hilliard | 525/105 |
| 4,228,051 | 10/1980 | Sakano | 260/23.7 R |
| 4,272,584 | 6/1981 | Goldberg et al. | 428/412 |
| 4,297,446 | 10/1981 | Lindner et al. | 525/66 |

FOREIGN PATENT DOCUMENTS

| | | |
|---|---|---|
| 196092 | 10/1986 | European Pat. Off. . |
| 340580 | 11/1989 | European Pat. Off. . |
| 663425 | 7/1995 | European Pat. Off. . |
| 4239436 | 5/1994 | Germany . |
| 61-278520 | 12/1980 | Japan . |
| 10144 | 2/1982 | Japan . |
| 58-198547 | 11/1983 | Japan . |
| 87-034069 | 7/1987 | Japan . |
| 2279729 | 11/1990 | Japan . |

*Primary Examiner*—Ralph H. Dean
*Attorney, Agent, or Firm*—Alexander Weitz

[57] ABSTRACT

There is disclosed a thermoplastic resin composition wherein the dispersion of a polyorganosiloxane in a thermoplastic resin is improved by the inclusion of a copolymer of an organosiloxane compound and an ester of a vinylcarboxylic acid or a copolymer of an aromatic vinyl compound, an unsaturated aliphatic nitrile compound and an organosiloxane compound. As a consequence of the excellent dispersion, the composition has improved moldability compared with conventional thermoplastic resins containing only polyorganosiloxane and yields moldings that have a releasability, lubricity, water repellency and mechanical strength superior to moldings from the conventional thermoplastic resins containing only polyorganosiloxane.

12 Claims, No Drawings

THERMOPLASTIC RESIN COMPOSITION

FIELD OF THE INVENTION

This invention relates to thermoplastic resin compositions. More particularly, it relates to a highly moldable thermoplastic resin composition that affords molded articles which exhibit excellent release properties, lubricity, water repellency and mechanical strength.

BACKGROUND OF THE INVENTION

Thermoplastic resins, particularly acrylonitrile-styrene resins (AS resins), and acrylonitrile-butadiene-styrene resins (ABS resins) exhibit excellent physical properties and are therefore widely employed for various types of moldings. However, these types of thermoplastic resins suffer from a poor moldability, release performance, lubricity, and water repellency. On the other hand, polyorganosiloxanes known as "silicone oil" and "silicone gums" exhibit excellent interfacial properties and for this reason are used as additives for improving the moldability, release performance, lubricity, and water repellency of thermoplastic resins. There have already been attempts at blending polyorganosiloxanes into these types of thermoplastic resins for the purpose of improving the properties of the latter (refer to Japanese Patent Publication Number Sho 57-10144. However, polyorganosiloxanes are in general poorly compatible with thermoplastic resins and particularly with AS and ABS resins, and this makes it quite difficult to obtain a homogeneous dispersion of the polyorganosiloxane in a microfine form in such thermoplastic resins. As a result, blends of polyorganosiloxane and thermoplastic resin exhibit a poor processability and yield molded articles beset by a number of problems. Thus, the polyorganosiloxane may bleed onto the surface of the molding; the molding may suffer from a reduced mechanical strength and an impaired appearance due to the phase separation of these two components; and a substantial variation from molding to molding may occur in the moldability, release performance, lubricity, water repellency, and mechanical strength.

SUMMARY OF THE INVENTION

It has now been discovered that the above problems can be solved by the admixture of a particular type of third component which improves the compatibility between the thermoplastic resin and polyorganosiloxane.

More specifically, the present invention takes as its object the introduction of a highly moldable thermoplastic resin composition that affords molded articles that exhibit excellent release properties, lubricity, water repellency, and mechanical strength.

The present invention therefore relates to a thermoplastic resin composition comprising (A) 100 weight parts of a thermoplastic resin selected from
  a copolymer of an aromatic vinyl compound and an unsaturated aliphatic nitrile compound,
  a copolymer of an aromatic vinyl compound, an unsaturated aliphatic nitrile compound, and a diene-type rubbery polymer, or
  mixtures of the preceding copolymers;

(B) 0.1 to 200 weight parts of a polyorganosiloxane; and (C) 0.1 to 200 weight parts of a copolymer selected from a copolymer of an organosiloxane compound and an ester of a vinylcarboxylic acid or a copolymer of a vinyl compound, an unsaturated aliphatic nitrile compound and an organosiloxane compound:

The present invention has been disclosed in Japanese Laid Open Patent Application Numbers Hei 07-063370 and Hei 07-063371, the full disclosure of which is hereby incorporated by reference.

DETAILED DESCRIPTION OF THE INVENTION

The thermoplastic resin constituting component (A) of the present invention is selected from copolymers of an aromatic vinyl compound and an unsaturated aliphatic nitrile compound; copolymers of an aromatic vinyl compound, unsaturated aliphatic nitrile compound, and diene-type rubbery polymer; of mixtures of the preceding copolymers. One candidate component (A) consists of a copolymer of an aromatic vinyl compound and an unsaturated aliphatic nitrile compound, wherein said aromatic vinyl compound is exemplified by styrene, alpha-methylstyrene, vinyltoluene, and the like, and the unsaturated aliphatic nitrile compound is exemplified by acrylonitrile, methacrylonitrile, and the like. The type and molecular weight of this copolymer and its method of preparation are not crucial. Among copolymers of this type, acrylonitrile-styrene copolymers are preferred for use in the present invention. Another candidate component (A) consists of copolymer of an aromatic vinyl compound, unsaturated aliphatic nitrile compound, and diene-type rubbery polymer, wherein the aromatic vinyl compound is as described above and the diene-type rubbery polymer is exemplified by polybutadiene, styrene-butadiene copolymers, acrylonitrile-butadiene copolymers, inter alia. The type and molecular weight of this copolymer and its method of preparation are not crucial. This copolymer is exemplified by copolymers obtained by the graft polymerization of a mixture of an aromatic vinyl compound and an unsaturated aliphatic nitrile compound on a diene-type rubbery polymer, and by mixtures prepared by mixing such a graft copolymer with a copolymer prepared by the polymerization of a mixture of aromatic vinyl compound and an unsaturated aliphatic nitrile compound. Among copolymers of this type, acrylonitrile-styrene-butadiene terpolymers are preferred for use in the present invention.

While the thermoplastic resin (A) used by the present invention consists of a thermoplastic resin selected from copolymers of an aromatic vinyl compound and an unsaturated aliphatic nitrile compound; copolymers of an aromatic vinyl compound, unsaturated aliphatic nitrile compound, and diene-type rubbery polymer; or mixtures of the preceding, the compounds that generate said thermoplastic resin (A) may include, in addition to said aromatic vinyl compound and unsaturated aliphatic nitrile compound, one or more other kinds of vinyl compounds for the purpose of improving the properties of the thermoplastic resin. Said optional vinyl compounds are exemplified by unsaturated carboxylic acids such as mathacrylic acid, acrylic acid, and the like; unsaturated carboxylate esters such as methyl methacrylate (MMA), methyl acrylate, and the like; and epoxy-functional unsaturated carboxylate esters such as glycidyl methacrylate and the like.

The polyorganosiloxane constituting component (B) of the present invention functions to equip the thermoplastic resin composition with such properties as moldability, lubricity, releasability, and water repellency. Polyorganosiloxane (B) is typified by straight-chain polyorganosiloxane that is endblocked by the hydroxyl group or a triorganosiloxane unit $R_3SiO_{1/2}$ wherein R denotes substituted and unsubstituted monovalent hydrocarbon groups, for example, substituted and unsubstituted alkyl groups such as methyl, ethyl, propyl, chloropropyl, and 3,3,3-trifluoropropyl; substituted and unsubstituted alkenyl groups such as vinyl, allyl, butenyl, and hexenyl; aryl groups such as phenyl; and substituted and unsubstituted aralkyl groups such as benzyl. The nonterminal siloxane units of component (B) consist mainly of the diorganosiloxane unit $R_2SiO$ in which R is defined as above. Component (B) is also typified by polyorganosiloxanes that contain, in addition to the above-described units, small quantities of $SiO_2$ units and/or $RSiO_{3/2}$ unit in which R is defined as above. Subject polyorganosiloxane (B) is exemplified by the following:
trimethylsiloxy-endblocked polydimethylsiloxanes,
dimethylhydroxysiloxy-endblocked polydimethylsiloxanes,
trimethylsiloxy-endblocked methylphenylpolysiloxanes,
trimethylsiloxy-endblocked methylphenylsiloxane-dimethylsiloxane copolymers,
trimethylsiloxy-endblocked diphenylpolysiloxanes,
trimethylsiloxy-endblocked diphenylsiloxane-dimethylsiloxane copolymers,
trimethylsiloxy-endblocked (3,3,3-trifluoropropyl)methylpolysiloxanes,
trimethylsiloxy-endblocked (3,3,3-trifluoropropyl)methylsiloxane-dimethylsiloxane copolymers,
trimethylsiloxy-endblocked dimethylsiloxane-methylvinylsiloxane copolymers,
dimethylvinylsiloxy-endblocked dimethylpolysiloxanes, and
dimethylvinylsiloxy-endblocked dimethylsiloxane-methylvinylsiloxane copolymers.

Insofar as the object of the present invention is not adversely affected, branched polyorganosiloxane containing the aforementioned $SiO_2$ unit and/or $RSiO_{3/2}$ units may be blended into component (B) according to the present invention in addition to the above-described straight-chain polyorganosiloxane.

While no specific restrictions apply to the viscosity of polyorganosiloxane (B), a low-viscosity component (B) is preferred for those applications where releasability is a critical issue. A high-viscosity component (B) is preferred for those applications where lubricity is a critical issue, and polyorganosiloxane with a viscosity of at least 1 million centistokes at 25° C. is particularly preferred here for its excellent lubricity and the persistence of its lubricity. The release and lubricating properties can be adjusted by mixing polyorganosiloxanes with different viscosities. Polyorganosiloxane (B) preferably contains no more than 50,000 weight-ppm and more preferably no more than 20,000 weight-ppm low-molecular-weight polyorganosiloxane having a vapor pressure at 200° C. greater than or equal to 10 mmHg.

Component (B) is added at 0.1 to 200 weight parts per 100 weight parts thermoplastic resin (A). Improvements in the moldability, releasability, lubricity, and so forth are not observed when component (B) is added at less than 0.1 weight part. On the other hand, when more than 200 weight parts component (B) is added, the volumetric ratio of component (B) relative to the thermoplastic resin becomes so large that the thermoplastic resin composition according to the present invention will no longer be solid.

The copolymer used as component (C) characterizes the present invention, and this component functions to improve the compatibility between the polyorganosiloxane (B) and thermoplastic resin (A) and thereby induce a homogeneous dispersion of the polyorganosiloxane (B) in a microfine form in the thermoplastic resin (A).

In a first embodiment of the present invention component (C) may be any copolymer that contains a block or blocks in which vinylcarboxylate ester units are contiguous (hereinafter abbreviated as VCE blocks) and a block or blocks in which organosiloxane units are contiguous (hereinafter abbreviated as OSU blocks), but the molecular weight and structure of this copolymer are not crucial. The subject vinylcarboxylate ester compound is exemplified by methyl methacrylate, ethyl methacrylate, propyl methacrylate, isopropyl methacrylate, butyl methacrylate, isobutyl methacrylate, phenyl methacrylate, benzyl methacrylate, allyl methacrylate, glycidyl methacrylate, methyl acrylate, ethyl acrylate, propyl acrylate, isopropyl acrylate, butyl acrylate, isobutyl acrylate, phenyl acrylate, benzyl acrylate, allyl acrylate, glycidyl acrylate, and the like. In addition to these compounds, this component may contain one or more other kinds of vinyl compounds, for example, aromatic vinyl compounds such as styrene, alpha-methylstyrene, and vinyltoluene; vinylcarboxylic acids such as methacrylic acid, and acrylic acid; and unsaturated aliphatic nitrile compounds such as acrylonitrile, and methacrylonitrile. On the other hand, the blocks of contiguous polyorganosiloxane (POS) units consist mainly of diorganosiloxane units $R_2SiO$, where R is defined above, and may contain small quantities of $RSiO_{3/2}$ and/or $SiO_2$ units. The average repeat number of the compounds in the VCE blocks is preferably at least 5 and more preferably at least 10. The upper limit on this average repeat number is not crucial, but greater length is generally preferred. The average repeat number of POS units in the blocks of contiguous POS units is preferably at least 5 and more preferably at least 10. The upper limit on this chain length is again not crucial, but greater length is generally preferred. The use is preferred of component (C) in which the VCE block: contiguous POS unit block ratio is from 1:0.2 to 0.2:1 as the molar ratio.

This copolymer (C) is exemplified by the so-called AB block copolymers and (AB)n block copolymers in which the VCE and OSU blocks are connected to give a straight chain, by graft copolymers in which the VCE block forms the main backbone and the OSU block branches limb-like therefrom, and by graft copolymers in which the OSU block forms the main backbone and the VCE block branches limb-like therefrom.

Subject copolymer (C) of vinylcarboxylate ester compound and organosiloxane compound can be prepared by well-known methods, such as anionic polymerization, radical polymerization, and so forth. For example, the AB block copolymer can be prepared by the living anionic polymerization of the vinylcarboxylate ester compound followed by anionic polymerization with hexaorganocyclotrisiloxane. The (AB)n block copolymer can be prepared by radical polymerization of the vinylcarboxylate ester compound and a polyorganosiloxane macroinitiator bearing radical reaction-initiating groups at its molecular terminals. Graft copolymer in which the VCE block forms the main backbone and the OSU block branches limb-like therefrom can be prepared by radical polymerization in the presence of a radical-reaction catalyst of the vinylcarboxylate ester compound with linear polyorganosiloxane macromonomer that carries in each molecule at least 1 radically reactive unsaturated group. Graft copolymer in which the OSU block forms the main backbone and the VCE block branches limb-like therefrom can be prepared by the radical polymerization in the presence of a radical-reaction catalyst of the vinylcarboxylate ester compound with polyorganosiloxane bearing side-chain mercapto group.

In a second embodiment of the invention, component (C) may be any copolymer that contains a block or blocks in which the aromatic vinyl compound and unsaturated aliphatic nitrile compound are contiguous (hereinafter abbreviated as AVC/UANC blocks) and a block or blocks in which organosiloxane units are contiguous (hereinafter abbreviated as OSU blocks), but the molecular weight and structure of this copolymer are not crucial. Said aromatic vinyl compound is exemplified by styrene, alpha-methylstyrene, vinyltoluene, and so forth, and said unsaturated aliphatic nitrile compound is exemplified by acrylonitrile, methacrylonitrile, and so forth. In addition to these compounds, this component may contain one or more other kinds of vinyl compounds, for example, unsaturated carboxylic acids such as methacrylic acid, and acrylic acid; unsaturated carboxylate esters such as methyl methacrylate, and methyl acrylate; and epoxy-functional unsaturated carboxylate esters such as glycidyl methacrylate. On the other hand, the OSU blocks will consist mainly of diorganosiloxane units $R_2SiO$ (R is as defined above) and may contain small quantities of $RSiO_{3/2}$ and/or $SiO_2$ units. The average repeat number of the compounds in the AVC/UANC blocks is preferably at least 5 and more preferably at least 10. The upper limit on this average repeat number is not crucial, but greater length is generally preferred. The average repeat number of organosiloxane units in the OSU blocks is preferably at least 5 and more preferably at least 10. The upper limit on this chain length is again not crucial, but greater length is generally preferred. The use is preferred of copolymer in which the AVC/UANC block: OSU block ratio is from 1:0.2 to 0.2:1 as the molar ratio.

This copolymer (C) is exemplified by the so-called AB block copolymers and (AB)n block copolymers in which the AVC/UANC and OSU blocks are connected to give a straight chain, by graft copolymers in which the AVC/UANC block forms the main backbone and the OSU block branches limb-like therefrom, and by graft copolymers in which the OSU block forms the main backbone and the AVC/UANC block branches limb-like therefrom.

Subject copolymer (C) of aromatic vinyl compound, unsaturated aliphatic nitrile compound, and organosiloxane compound can be prepared by well-known methods, such as anionic polymerization, radical polymerization, and so forth. For example, the AB block copolymer can be prepared by the living anionic polymerization of a mixture of aromatic vinyl compound and unsaturated aliphatic nitrile compound followed by anionic polymerization with hexaorganocyclotrisiloxane. The (AB)n block copolymer can be prepared by the radical polymerization of a mixture of aromatic vinyl compound, unsaturated aliphatic nitrile compound, and polyorganosiloxane macroinitiator bearing radical reaction-initiating groups at its molecular terminals. Graft copolymer in which the AVC/UANC block forms the main backbone and the OSU block branches limb-like therefrom can be prepared by radical polymerization in the presence of a radical-reaction catalyst of a mixture of aromatic vinyl compound and unsaturated aliphatic nitrile compound with linear polyorganosiloxane macromonomer that carries in each molecule at least 1 radically reactive unsaturated group. Graft copolymer in which the OSU block forms the main backbone and the AVC/UANC block branches limb-like therefrom can be prepared by the radical polymerization in the presence of a radical-reaction catalyst of a mixture of aromatic vinyl compound and unsaturated aliphatic nitrile compound with polyorganosiloxane bearing side-chain mercapto group.

Component (C) is added at from 0.1 to 200 weight parts per 100 weight parts thermoplastic resin (A). The basis for this range is as follows: when added at less than 0.1 weight part component (C) cannot function in its role of increasing the compatibility between the thermoplastic resin (A) and polyorganosiloxane (B); the addition of more than 200 weight parts component (C) causes a decline in the mechanical strength of the thermoplastic resin composition.

The thermoplastic resin composition according to the present invention can be prepared by mixing the above-described components (A), (B), and (C) to homogeneity. The devices that can be used for this preparation are exemplified by the well-known mixing devices ordinarily used for the blending of thermoplastic resins, such as heated batch mixers and heated continuous mixers. No restrictions apply to the mixing sequence for components (A), (B), and (C). The heating and mixing conditions will typically be the same as for the melt-mixing of the thermoplastic resin (A) itself, and mixing times of at least several minutes will be sufficient.

Insofar as the object of the present invention is not adversely affected, the thermoplastic resin composition according to the present invention may also contain, in addition to components (A), (B), and (C), improvers and/or additives for thermoplastic resins such as, for example, reinforcing agents and fillers such as glass fiber, carbon fiber, mica, talc, silica micropowder, and the like; moldability improvers such as organic lubricants, and specialized additives such as flame retardants, antistatics, colorants such as pigments and so forth, antimicrobials, and the like.

The presence of component (C) in the thermoplastic resin composition according to the present invention causes the polyorganosiloxane to be highly dispersible in the thermoplastic resin, and as a result the subject composition exhibits a much better moldability, releasability, lubricity, water repellency, and mechanical strength than conventional thermoplastic resins containing simply the polyorganosiloxane. The thermoplastic resin composition according to the present invention can be molded as is by injection or extrusion molding to yield molded products, or it can be admixed as an improver into thermoplastic resins and particularly AS and ABS resins.

EXAMPLES

The present invention is explained below through working examples. In the examples and comparative examples, "part" denotes "weight part", the viscosity is the value measured at 25° C., and "cSt" stands for "centistokes". Below, blocks of contiguous methyl methacrylate are referred to as MMA blocks, and blocks in which dimethylsiloxane units are contiguous are referred to as DMS blocks. Blocks in which styrene is contingous with acrylonitrile are referred to as AS blocks. The following methods were used in the examples to evaluate the appearance of the moldings, to measure the average particle size of the polyorganosiloxane phase, and to measure the lubricity, tensile strength, and impact strength of the moldings.

Evaluation of molding appearance

The sample, optionally diluted with the specified thermoplastic resin (dilution was carried out by heating and mixing in a Labo-Plast™ Mill), was molded using a press to give a test sheet. The appearance of this test sheet was inspected visually, and the results of the inspection were scored as follows.

+: the surface was uniform, and no abnormalities such as flow marks were observed x: due to poor dispersion of the polyorganosiloxane, the surface was not uniform and flow marks had developed Measurement of the average particle size of the polyorganosiloxane phase The sample was cooled with liquid nitrogen, crushed, and then immersed in hexane at room temperature in order to dissolve out the polyorganosiloxane component in the sample. The fracture surface was subsequently inspected with a scanning electron microscope, and the average particle size of the polyorganosiloxane phase was determined by measuring the diameters of the voids left by the polyorganosiloxane.

Measurement of the lubricity of the moldings

The sample, optionally diluted with the specified thermoplastic resin, was converted into a flat test specimen using a press. The specified thermoplastic resin was also molded into a cylindrical test specimen using an injection molder. These were used to measure the dynamic friction coefficient, and its range of fluctuation, using a thrust friction wear tester from Toyo Seiki Seisakusho, Ltd., at a pressure of 1 kg/cm² and a peripheral velocity of 50 cm/s.

Measurement of the tensile strength and Izod impact strength of the moldings

The sample, optionally diluted with the specified thermoplastic resin, was molded into the respective test specimens for measurement of the tensile strength and Izod impact strength. The tensile strength and Izod impact strength were measured according to the test methods described in Japanese Industrial Standard (JIS) K 6874.

Reference Example 1

Synthesis of copolymer (a) in which MMA block forms the main backbone and DMS block branches limb-like therefrom The following were introduced into a 200-mL flask equipped with a stirrer and reflux condenser: 20 g of alpha-methacryloxypropyl-omega-trimethylsiloxypolydimethylsiloxane (number-average molecular weight=6,360), 20 g of methyl methacrylate, and 80 g of toluene. The reaction system was purged with nitrogen, and the flask was heated to 65° C. After the introduction of 100 mg of azoisobutyronitrile, a polymerization reaction was run by stirring for 24 hours at 65° C. After completion of the reaction, the reaction mixture was introduced into a large excess of isopropyl alcohol to produce a white precipitate. This precipitate was separated, washed with isopropyl alcohol, and then dried in a vacuum to yield 32.5 g of a white solid.

Analysis of this white solid by gel permeation chromatography (GPC) and nuclear magnetic resonance spectroscopy (NMR) confirmed it to be a methyl methacrylate-dimethylsiloxane copolymer in which the average repeat number in the MMA block was 76, the average repeat number for the organosiloxane unit in the OSU block was 82, and the MMA block:OSU block quantitative ratio was 1:1.08 as the molar ratio. The number-average molecular weight of this copolymer was 59,200.

Reference Example 2

Synthesis of copolymer (b) in which the OSU block forms the main backbone and the MMA block branches limb-like therefrom The following were introduced: 16 g of trimethylsiloxy-endblocked dimethylsiloxane-methyl(gamma-mercaptopropyl)siloxane copolymer (number-average molecular weight=10,200, mercapto equivalent weight=5,100), 24 g of methyl methacrylate, and 80 g of toluene. The reaction system was purged with nitrogen, and the flask was heated to 65° C. After the introduction of 100 mg of azoisobutyronitrile, a polymerization reaction was run by stirring for 24 hours at 65° C. After completion of the reaction, the reaction mixture was introduced into a large excess of isopropyl alcohol to produce a white precipitate. This precipitate was separated, washed with isopropyl alcohol, and then dried in a vacuum to yield 30.0 g of a white solid.

Analysis of this white solid by gel permeation chromatography (GPC) and nuclear magnetic resonance spectroscopy (NMR) confirmed it to be a methyl methacrylate-dimethylsiloxane-organosiloxane copolymer in which the average repeat number in the MMA block was 58, the average repeat number for the organosiloxane unit in the OSU block was 69, and the MMA block:DMS block quantitative ratio was 1:1.19 as the molar ratio. The number-average molecular weight of this copolymer was 22,000.

Example 1

There were placed in a 30-mL Labo-Plast™ Mill 19 g of acrylonitrile-styrene copolymer resin (AS resin) (brand name: Sanrex SAN-C, from Mitsubishi Kagaku Kabushiki Kaisha, melt flow rate at 200° C./10 kg=25 g/10 minutes), 1 g of trimethylsiloxy-endblocked polydimethylsiloxane (viscosity=10 million cSt), and 0.5 g of the methyl methacrylate-dimethylsiloxane copolymer (a) from Reference Example 1. Mixing was then carried out at 200° C. and 100 rpm for 10 minutes. Cooling thereafter gave a solid white thermoplastic resin composition. This thermoplastic resin composition was submitted to measurement of the average particle size of its polyorganosiloxane phase, and its moldings were evaluated for their surface condition, lubricity, tensile strength, and impact strength. These results are reported in Table 1 below.

Example 2

A solid white thermoplastic resin composition was prepared as in Example 1, but in this case using the copolymer (b) of Reference Example 2 instead of the methyl methacrylate-dimethylsiloxane copolymer (a) that was used in Example 1. The resulting thermoplastic resin composition was submitted to measurement of the average particle size of its polyorganosiloxane phase, and its molding was evaluated for surface condition. These results are reported in Table 1 below.

Example 3

A solid white thermoplastic resin composition was prepared as in Example 1, but in this case using trimethylsiloxy-endblocked polydimethylsiloxane with a viscosity of 10,000 cSt in place of the trimethylsiloxy-endblocked polydimethylsiloxane with a viscosity of 10 million cSt that was used in Example 1. The properties of this composition were measured as in Example 1, and these results are reported in Table 1 below.

Example 4

There were placed in a 30-mL Labo-Plast™ Mill 19 g of acrylonitrile-styrene copolymer (AS resin) (brand name: Sanrex SAN-C, from Mitsubishi Kagaku Kabushiki Kaisha, melt flow rate at 200° C./10 kg=25 g/10 minutes), 1 g of trimethylsiloxy-endblocked polydimethylsiloxane (viscosity=10 million cSt), and 5 g of the methyl methacrylate-dimethylsiloxane copolymer (a) from Reference Example 1. Mixing was then carried out at 220° C. and 100 rpm for 10 minutes. Cooling thereafter gave a solid white thermoplastic resin composition. One gram of the resulting thermoplastic resin composition and 19 g of the aforementioned AS resin were placed in a 30-mL Labo-Plast™ Mill, mixed at 220° C. and 100 rpm for 10 minutes, and then cooled to yield a solid white thermoplastic resin composition. The properties of this composition were measured as in Example 1, and these results are reported in Table 1 below.

Example 5

A solid white thermoplastic resin composition was prepared as in Example 1, but in this case using an acrylonitrile-styrene-butadiene terpolymer (ABS resin) (brand name: Toyolac™ 100, from Toray Kabushiki Kaisha, melt viscosity (220° C.)=4×10³ poise) in place of the acrylonitrile-styrene copolymer (AS resin) that was used in Example 1. The properties of this composition were measured as in Example 1, and these results are reported in Table 1 below.

Example 6

A solid white thermoplastic resin composition was prepared as in Example 2, but in this case using an acrylonitrile-styrene-butadiene copolymer (ABS resin) (brand name: Toyolac™ 100, from Toray Kabushiki Kaisha, melt viscosity (220° C.)=4×10³ poise) in place of the acrylonitrile-styrene copolymer (AS resin) that was used in Example 2. The resulting thermoplastic resin composition was submitted to measurement of the average particle size of its polyorganosiloxane phase, and its molding was evaluated for surface condition. These results are reported in Table 1 below.

Example 7

A solid white thermoplastic resin composition was prepared as in Example 3, but in this case using an acrylonitrile-styrene-butadiene copolymer (ABS resin) (brand name: Toyolac™ 100, from Toray Kabushiki Kaisha, melt viscosity (220° C.)=4×10³ poise) in place of the acrylonitrile-styrene copolymer (AS resin) that was used in Example 3. The properties of this composition were measured as in Example 3, and these results are reported in Table 1 below.

Comparative Example 1

There were placed in a 30-mL Labo-Plast™ Mill 19 g of acrylonitrile-styrene copolymer (AS resin) (brand name: Sanrex SAN-C, from Mitsubishi Kagaku Kabushiki Kaisha, melt flow rate at 200° C./10 kg=25 g/10 minutes) and 1 g of trimethylsiloxy-endblocked polydimethylsiloxane (viscosity=100 million cSt). Mixing was then carried out at 220° C. and 100 rpm for 10 minutes. Cooling thereafter gave a solid white thermoplastic resin composition. This thermoplastic resin composition was submitted to measurement of the average particle size of its polyorganosiloxane phase, and its moldings were evaluated for their surface condition, lubricity, tensile strength, and impact strength. These results are reported in Table 1 below.

Comparative Example 2

A solid white thermoplastic resin composition was prepared as in Comparative Example 1, but in this case using trimethylsiloxy-endblocked polydimethylsiloxane with a viscosity of 10,000 cSt in place of the trimethylsiloxy-endblocked polydimethylsiloxane with a viscosity of 10 million cSt that was used in Comparative Example 1. The properties of this composition were measured as in Comparative Example 1, and these results are reported in Table 1 below.

Comparative Example 3

A solid white thermoplastic resin composition was prepared as in Comparative Example 1, but in this case using an acrylonitrile-styrene-butadiene copolymer (ABS resin) (brand name: Toyolac™ 100, from Toray Kabushiki Kaisha, melt viscosity (220° C.)=4×10³ poise) in place of the acrylonitrile-styrene copolymer (AS resin) that was used in Comparative Example 1. The properties of this composition were measured as in Comparative Example 1, and these results are reported in Table 1 below.

Comparative Example 4

A solid white thermoplastic resin composition was prepared as in Comparative Example 3, but in this case using trimethylsiloxy-endblocked polydimethylsiloxane with a viscosity of 10,000 cSt in place of the trimethylsiloxy-endblocked polydimethylsiloxane with a viscosity of 10 million cSt that was used in Comparative Example 3. The properties of this composition were measured as in Comparative Example 3, and these results are reported in Table 1 below.

TABLE 1

| | surface state of the molding | average particle size of the POS phase (micrometers) | lubricity of the molding dynamic friction coefficient | lubricity of the molding range of fluctuation | tensile strength of the molding kg/cm² | impact strength of the molding kg/cm² |
|---|---|---|---|---|---|---|
| Example 1 | + | 2 | 0.09 | 0.005 | 530 | 2.4 |
| Example 2 | + | 4 | — | — | — | — |
| Example 3 | + | 2 | 0.10 | 0.005 | 530 | 2.2 |
| Example 4 | + | 1 | 0.09 | 0.005 | 540 | 2.3 |
| Example 5 | + | 1 | 0.10 | 0.005 | 290 | 20 |
| Example 6 | + | 3 | — | — | — | — |
| Example 7 | + | 1 | 0.10 | 0.005 | 280 | 20 |
| Comparative Example 1 | x | 15 | 0.12 | 0.02 | 470 | 1.8 |
| Comparative Example 2 | x | 12 | 0.12 | 0.02 | 470 | 1.8 |
| Comparative Example 3 | x | 10 | 0.15 | 0.02 | 250 | 21 |
| Comparative Example 4 | x | 10 | 0.14 | 0.02 | 240 | 21 | abbreviation used: POS = polyorganosiloxane

Reference Example 3

Synthesis of copolymer (c) in which the AS block forms the main backbone and the DMS block branches limb-like therefrom The following were introduced into a 200-mL flask equipped with a stirrer and reflux condenser: 20 g of alpha-methacryloxypropyl-omega-trimethylsiloxypolydimethylsiloxane (number-average molecular weight=6,360), 13 g of styrene monomer, 7 g of acrylonitrile monomer, and 80 g of toluene. The reaction system was purged with nitrogen, and the flask was heated to 65° C. After the introduction of 100 mg of azoisobutyronitrile, a polymerization reaction was run by stirring for 24 hours at 65° C. After completion of the reaction, the reaction mixture was introduced into a large excess of isopropyl alcohol to produce a white precipitate. This precipitate was separated, washed with isopropyl alcohol, and then dried in a vacuum to yield 26.0 g of a white solid.

Analysis of this white solid confirmed it to be a styrene-acrylonitrile-dimethylsiloxane copolymer in which the average repeat number in the AS block was 96, the average repeat number for the organosiloxane unit in the OSU block was 82, and the AS block:OSU block ratio was 1:0.85 as the molar ratio. The number-average molecular weight of this copolymer was 36,100.

Reference Example 4

Synthesis of copolymer (d) in which the OSU block forms the main backbone and the AS block branches limb-like therefrom The following were introduced: 16 g trimethylsiloxy-endblocked dimethylsiloxane-methyl(gamma-mercaptopropyl)siloxane copolymer (number-average molecular weight=10,200, mercapto equivalent weight=5,100), 15.6 g styrene monomer, 8.4 g acrylonitrile monomer, and 80 g toluene. The reaction system was purged with nitrogen, and the flask was heated to 65° C. After the introduction of 100 mg azoisobutyronitrile, a polymerization reaction was run by stirring for 24 hours at 65° C. After completion of the reaction, the reaction mixture was introduced into a large excess of isopropyl alcohol to produce a white precipitate. This precipitate was separated, washed with isopropyl alcohol, and then dried in a vacuum to yield 28.0 g of a white solid.

Analysis of this white solid by gel permeation chromatography (GPC) and nuclear magnetic resonance spectroscopy (NMR) confirmed it to be a styrene-acrylonitrile-organosiloxane copolymer in which the average repeat number in the AS block was 71, the average repeat number for the organosiloxane unit in the OSU block was 69, and the AS block:OSU block quantitative ratio was 1:0.97 as the molar ratio. The number-average molecular weight of this copolymer was 21,000.

Example 8

There were placed in a 30-mL Labo-Plast™ Mill 19 g of acrylonitrile-styrene copolymer resin (AS resin) (brand name: Sanrex SAN-C, from Mitsubishi Kagaku Kabushiki Kaisha, melt flow rate at 200° C./10 kg=25 g/10 minutes), 1 g of trimethylsiloxy-endblocked polydimethylsiloxane (viscosity=10 million cSt), and 0.5 g of the styrene-acrylonitrile-dimethylpolysiloxane copolymer (c) from Reference Example 3. Mixing was then carried out at 220° C. and 100 rpm for 10 minutes. Cooling thereafter gave a solid white thermoplastic resin composition. This thermoplastic resin composition was submitted to measurement of the average particle size of its polyorganosiloxane phase, and its moldings were evaluated for their surface condition, lubricity, tensile strength, and impact strength. These results are reported in Table 2 below.

Example 9

A solid white thermoplastic resin composition was prepared as in Example 8, but in this case using the copolymer (d) of Reference Example 4 instead of the styrene-acrylonitrile-organopolysiloxane copolymer (c) that was used in Example 8. The resulting thermoplastic resin composition was submitted to measurement of the average particle size of its polyorganosiloxane phase, and its molding was evaluated for surface condition. These results are reported in Table 2 below.

Example 10

A solid white thermoplastic resin composition was prepared as in Example 8, but in this case using trimethylsiloxy-endblocked polydimethylsiloxane with a viscosity of 10,000 cSt in place of the trimethylsiloxy-endblocked polydimethylsiloxane with a viscosity of 10 million cSt that was used in Example 8. The properties of this composition were measured as in Example 8, and these results are reported in Table 2 below.

Example 11

There were placed in a 30-mL Labo-Plast™ Mill 10 g of acrylonitrile-styrene copolymer (AS resin) (brand name: Sanrex SAN-C, from Mitsubishi Kagaku Kabushiki Kaisha, melt flow rate at 200° C./10 kg=25 g/10 minutes), 10 g of trimethylsiloxy-endblocked polydimethylsiloxane (viscosity=10 million cSt), and 5 g of the styrene-acrylonitrile-organopolysiloxane copolymer (c) from Reference Example 3. Mixing was then carried out at 220° C. and 100 rpm for 10 minutes. Cooling thereafter gave a solid white thermoplastic resin composition. One gram of the resulting thermoplastic resin composition and 19 g of the aforementioned AS resin were placed in a 30-mL Labo-Plast™ Mill, mixed at 220° C. and 100 rpm for 10 minutes, and then cooled to yield a solid white thermoplastic resin composition. The properties of this composition were measured as in Example 8, and these results are reported in Table 2 below.

Example 12

A solid white thermoplastic resin composition was prepared as in Example 8, but in this case using an acrylonitrile-styrene-butadiene terpolymer (ABS resin) (brand name: Toyolac 100, from Toray Kabushiki Kaisha, melt viscosity (220° C.)=4×10³ poise) in place of the acrylonitrile-styrene copolymer (AS resin that was used in Example 8. The properties of this composition were measured as in Example 8, and these results are reported in Table 2 below.

Example 13

A solid white thermoplastic resin composition was prepared as in Example 9, but in this case using an acrylonitrile-styrene-butadiene copolymer (ABS resin) (brand name: Toyolac™ 100, from Toray Kabushiki Kaisha, melt viscosity (220° C.)=4×10³ poise) in place of the acrylonitrile-styrene copolymer (AS resin) that was used in Example 9. The resulting thermoplastic resin composition was submitted to measurement of the average particle size of its polyorganosiloxane phase, and its molding was evaluated for surface condition. These results are reported in Table 2 below.

Example 14

A solid white thermoplastic resin composition was prepared as in Example 10, but in this case using an acrylonitrile-styrene-butadiene copolymer (ABS resin) (brand name: Toyolac 100, from Toray Kabushiki Kaisha, melt viscosity (220° C.) =4×10³ poise) in place of the acrylonitrile-styrene copolymer (AS resin) that was used in Example 10. The properties of this composition were measured as in Example 10, and these results are reported in Table 2 below.

Comparative Example 5

There were placed in a 30-mL Labo-Plast™ Mill 19 g of acrylonitrile-styrene copolymer (AS resin) (brand name: Sanrex SAN-C, from Mitsubishi Kagaku Kabushiki Kaisha, melt flow rate at 200° C./10 kg=25 g/10 minutes) and 1 g of trimethylsiloxy-endblocked polydimethylsiloxane (viscosity=10 million cSt). Mixing was then carried out at 220° C. and 100 rpm for 10 minutes. Cooling thereafter gave a solid white thermoplastic resin composition. This thermoplastic resin composition was submitted to measurement of the average particle size of its polyorganosiloxane phase, and its moldings were evaluated for their surface condition, lubricity, tensile strength, and impact strength. These results are reported in Table 2 below.

Comparative Example 6

A solid white thermoplastic resin composition was prepared as in Comparative Example 5, but in this case using trimethylsiloxy-endblocked polydimethylsiloxane with a viscosity of 10,000 cSt in place of the trimethylsiloxy-endblocked polydimethylsiloxane with a viscosity of 10 million cSt that was used in Comparative Example 5. The properties of this composition were measured as in Comparative Example 5, and these results are reported in Table 2 below.

Comparative Example 7

A solid white thermoplastic resin composition was prepared as in Comparative Example 5, but in this case using an acrylonitrile-styrene-butadiene copolymer (ABS resin) (brand name: Toyolac™ 100, from Toray Kabushiki Kaisha, melt viscosity (220° C.)=4×10³ poise) in place of the acrylonitrile-styrene copolymer (AS resin) that was used in Comparative Example 5. The properties of this composition were measured as in Comparative Example 5, and these results are reported in Table 2 below.

Comparative Example 8

A solid white thermoplastic resin composition was prepared as in Comparative Example 7, but in this case using trimethylsiloxy-endblocked polydimethylsiloxane with a viscosity of 10,000 cSt in place of the trimethylsiloxy-endblocked polydimethylsiloxane with a viscosity of 10 million cSt that was used in Comparative Example 7. The properties of this composition were measured as in Comparative Example 7, and these results are reported in Table 2 below.

TABLE 2

| | surface state of the molding | average particle size of the POS phase (micrometers) | lubricity of the molding | | tensile strength of the molding kg/cm² | impact strength of the molding kg/cm² |
|---|---|---|---|---|---|---|
| | | | dynamic friction co-efficient | range of fluctuation | | |
| Example 8 | + | 1 | 0.09 | 0.005 | 530 | 2.3 |
| Example 9 | + | 4 | — | — | — | — |
| Example 10 | + | 1 | 0.11 | 0.005 | 520 | 2.2 |
| Example 11 | + | 1 | 0.09 | 0.005 | 530 | 2.3 |
| Example 12 | + | 1 | 0.10 | 0.005 | 270 | 20 |
| Example 13 | + | 3 | — | — | — | — |
| Example 14 | + | 1 | 0.10 | 0.005 | 270 | 20 |
| Comparative Example 5 | x | 15 | 0.12 | 0.02 | 470 | 1.8 |
| Comparative Example 6 | x | 12 | 0.12 | 0.02 | 470 | 1.8 |
| Comparative Example 7 | x | 10 | 0.15 | 0.02 | 250 | 21 |
| Comparative Example 8 | x | 10 | 0.14 | 0.02 | 240 | 21 | abbreviation used: POS = polyorganosiloxane

That which is claimed is:

1. A thermoplastic resin composition comprising:

(A) 100 parts by weight of a thermoplastic resin selected from the group consisting of
      (i) a copolymer of an aromatic vinyl compound and an unsaturated aliphatic nitrile compound,
      (ii) a copolymer of an aromatic vinyl compound, an unsaturated aliphatic nitrile compound and a diene-type rubbery polymer, and
      (iii) mixtures of the preceding copolymers;

(B) 0.1 to 200 parts by weight of a polyorganosiloxane; and (C) 0.1 to 200 parts by weight of a copolymer of an organosiloxane compound and an ester of a vinylcarboxylic acid.

2. The thermoplastic resin composition according to claim 1, wherein the thermoplastic resin (A) is a styrene-acrylonitrile copolymer.

3. The thermoplastic resin composition according to claim 1, wherein the thermoplastic resin (A) is a styrene-acrylonitrile-butadiene terpolymer.

4. The thermoplastic resin composition according to claim 1, wherein the polyorganosiloxane (B) has a viscosity at 25° C. of at least 1,000,000 centistokes.

5. The thermoplastic resin composition according to claim 1, wherein the polyorganosiloxane (B) contains no more than 50,000 parts per million by weight of low molecular weight organosiloxane having a vapor pressure ≧ 10 mm Hg at 200° C.

6. The thermoplastic resin composition according to claim 1, wherein said copolymer (C) is a block copolymer comprising blocks of poly(methyl methacrylate) and blocks of polydimethylsiloxane.

7. The thermoplastic resin composition according to claim 1, wherein said polyorganosiloxane (B) is polydimethylsiloxane.

8. The thermoplastic resin composition according to claim 2, wherein said polyorganosiloxane (B) is polydimethylsiloxane.

9. The thermoplastic resin composition according to claim 3, wherein said polyorganosiloxane (B) is polydimethylsiloxane.

10. The thermoplastic resin composition according to claim 1, wherein said ester of a vinylcarboxylic acid is selected from the group consisting of methyl methacrylate, ethyl methacrylate, propyl methacrylate, isopropyl methacrylate, butyl methacrylate, isobutyl methacrylate, phenyl methacrylate, benzyl methacrylate, allyl methacrylate, glycidyl methacrylate, methyl acrylate, ethyl acrylate, propyl acrylate, isopropyl acrylate, butyl acrylate, isobutyl acrylate, phenyl acrylate, benzyl acrylate, allyl acrylate and glycidyl acrylate.

11. The thermoplastic resin composition according to claim 10, wherein said thermoplastic resin (A) is selected from the group consisting of a styrene-acrylonitrile copolymer and a styrene-acrylonitrile-butadiene terpolymer.

12. The thermoplastic resin composition according to claim 11, wherein said polyorganosiloxane (B) is polydimethylsiloxane.

* * * * *